United States Patent
Yoshida et al.

(10) Patent No.: US 6,302,225 B1
(45) Date of Patent: Oct. 16, 2001

(54) POLYCRYSTAL DIAMOND TOOL

(75) Inventors: Katsuhito Yoshida; Yasunobu Ogata; Junichi Shiraishi; Tetsuo Nakai, all of Hyogo (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 09/295,356

(22) Filed: Apr. 21, 1999

(30) Foreign Application Priority Data

Apr. 28, 1998 (JP) .................................................. 10-118773

(51) Int. Cl.⁷ ..................................................... E21B 10/46
(52) U.S. Cl. ........................ 175/434; 175/420.2; 30/350; 30/357; 51/307; 407/32
(58) Field of Search .................. 175/420.2, 434; 30/350, 357; 51/307; 407/32

(56) References Cited

U.S. PATENT DOCUMENTS

| | | | |
|---|---|---|---|
| 3,938,599 | * | 2/1976 | Horn ..................................... 175/329 |
| 4,124,401 | | 11/1978 | Lee et al. . |
| 4,288,248 | | 9/1981 | Bovenkerk et al. . |
| 4,690,320 | | 9/1987 | Morishita et al. . |
| 4,861,673 | * | 8/1989 | Hara et al. ............................. 428/469 |
| 5,037,704 | * | 8/1991 | Nakai et al. ........................... 428/550 |
| 5,151,107 | * | 9/1992 | Cho et al. ................................ 51/295 |
| 5,355,969 | * | 10/1994 | Hardy et al. ........................... 175/432 |
| 5,807,032 | * | 9/1998 | Abe ........................................ 407/118 |
| 6,090,343 | * | 7/2000 | Kear et al. .............................. 419/45 |

FOREIGN PATENT DOCUMENTS

| | | |
|---|---|---|
| 0 329 955 | 8/1989 | (EP) . |
| 53-114589 | 10/1978 | (JP) . |
| 60-187603 | 9/1985 | (JP) . |
| 61-33865 | 2/1986 | (JP) . |
| 63-260858 | 10/1988 | (JP) . |
| 4-74766 | 3/1992 | (JP) . |
| 6-9271 | 1/1994 | (JP) . |
| 6-9272 | 1/1994 | (JP) . |
| 10-230465 | 9/1998 | (JP) . |

* cited by examiner

Primary Examiner—Daniel J. Jenkins
(74) Attorney, Agent, or Firm—McDermott, Will & Emery

(57) ABSTRACT

A polycrystal diamond tool is provided whose heat resistance, strength and anti-adhesion property are improved by modifying the porosity of a diamond sintered compact and which comprises a diamond sintered compact, sintered under ultra-high pressure and high temperature, brazed onto a tool substrate, in which the cutting edge vicinity part consists of 85 to 99 volume % of the diamond sintered compact material consisting of diamond grains bonded with each other and the balance of pores, and the other part than the cutting edge vicinity part consists of diamond grains and the balance of a brazing material.

6 Claims, 1 Drawing Sheet

POLYCRYSTAL DIAMOND TOOL

FIELD OF THE INVENTION

This invention relates to a polycrystal diamond tool excellent in, in particular, heat resistance, strength and anti-adhesion property and more particularly, it is concerned with a polycrystal diamond tool having an improved heat resistance, strength and anti-adhesion property as a tool, provided by removing binding materials and modifying a porosity of a diamond sintered compact.

DESCRIPTION OF THE PRIOR ART

Diamond has been used for various tools such as cutting tools, dies, bits, etc. from old times because of its excellent properties, for example, high hardness and high thermal conductivity. Particularly, a diamond compact obtained by sintering diamond powder with a binder predominantly consisting of an iron group metal such as cobalt, etc. under ultra-high pressure and high temperature has widely been used for cutting non-ferrous metals, plastics, ceramics, dressers, drill bits, wire drawing dies, etc. because of being free from disadvantages of single crystal diamond that breakage due to cleavage takes place.

However, the diamond sintered compact using a binder of an iron group metal such as cobalt has a disadvantage that the heat resistance is not sufficient. That is, when this sintered compact is heated at a temperature of at least 750° C., occurrence of microcracks and lowering of the hardness or strength appear and at a temperature of at least 900° C., the sintered compact is broken.

This phenomenon is caused by two actions, in combination, that (1) graphitization of diamond by an iron group metal such as Co is accelerated to decrease the bonding strength between grains or the hardness of grains and (2) when using at a high temperature, cracks occur due to difference of thermal expansion coefficients of between an iron group metal such as Co (e.g. linear thermal expansion coefficient of Co: $18 \times 10^{-6}$) and diamond (thermal expansion coefficient: $4.5 \times 10^{-6}$), thus weakening the bonding strength between grains.

Several methods have been proposed to solve these problems and improve the heat resistance. For example, Japanese Patent Laid-Open Publication No. 114589/1978 discloses a diamond sintered compact in which diamond is sintered using a binder such as Co, etc. and the binder is removed by treatment with an acid to obtain the iron group metal-removed diamond sintered compact. However, this diamond sintered compact has a problem that the fracture strength is remarkably lowered depending upon an amount of the residual metal or pores and accordingly, the use thereof is limited.

Furthermore, Japanese Patent Laid-Open Publication No. 187603/1985 discloses a diamond sintered compact in which a binder consisting of an iron group metal such as Co, etc. is removed by an acid treatment and then pores remained in the sintered compact is permeated with a metallic brazing agent consisting mainly of Cu or Ag to obtain pores-free diamond sintered compact. In this case, it is reported that the strength or fracture strength of the sintered compact are improved by removing pores, but application ranges thereof as a tool are limited, since the quality of a worked surface is so bad as not to be practical due to adhesion of a workpiece to a tool edge during working.

As a method of using a binder other than iron group metals such as Co, etc., it has been proposed to use SiC as a binder, as disclosed in U.S. Pat. No. 4,124,401. In this case, however, a diamond sintered compact has been sintered under conditions of relatively low pressure and low temperature by a hot press or the like, so when it is used as a tool, the wear resistance is inferior because of less bonding among diamond grains.

Furthermore, a proposal to obtain a diamond sintered compact with a high heat resistance by impregnating diamond grains with liquid phase Si at a high pressure and high temperature is disclosed in Japanese Patent Laid-Open Publication No. 33865/1986. However, this method comprising reacting Si with diamond to form SiC to be used as a binder, has a disadvantage that unreacted Si remains to decrease the strength and wear resistance.

In order to remove influences of the unreacted and remaining Si, use of $Si_3N_4$ as a raw material for a binder of a sintered compact has been proposed in Japanese Patent Laid-Open Publication No. 260858/1988. According to this method, however, bonding of $Si_3N_4$ and SiC is not so strong that the strength and wear resistance are not satisfied.

Of late, such a knowledge has been attained that not only iron group metals such as Co, etc., but also carbonates of alkaline earth metals such as Mg, Ca, Sr, Ba, etc. are also effective similarly to the iron group metals such as Co, etc. and sintered compacts using these materials as a binder has been proposed (Japanese Patent Laid-Open Publication Nos. 74766/1992, 9271/1994 and 9272/1994). The diamond sintered compacts obtained by these methods are excellent in heat resistance, strength and wear resistance, but when using these carbonates for obtaining diamond sintered compacts, a pressure of 7 to 10 GPa and a temperature of 2000 to 2500° C., much higher than those in the case of using the iron group metals such as Co, etc., i.e. 5 GPa and 1400° C., are required, which are, therefore, not practically used from the standpoint of the cost.

As described above, a number of proposals have hitherto been made noting a binder of a diamond sintered compact, in particular, the presence of pores replacing the binder or a material to be filled in the pores, but a diamond sintered compact having more excellent properties as to application ranges, heat resistance, anti-adhesion property etc. of the diamond tool using the diamond sintered compact has not been developed.

SUMMARY OF THE INVENTION

It is an object of the present invention to provide a polycrystal diamond tool in which the porosity in a binder material of a diamond sintered compact is modified to improve the heat resistance, strength and anti-adhesion property as a tool.

It is another object of the present invention to markedly improve tool properties by modifying a composition of a heat resistance diamond sintered compact described in Japanese Patent Laid-Open Publication No. 187603/1985.

It is a further object of the present invention to provide a process for the production of a polycrystal diamond tool in economical manner.

These objects can be attained by a polycrystal diamond tool comprising a diamond sintered compact, sintered under ultra-high pressure and high temperature, brazed onto a tool substrate, in which the cutting edge vicinity part consists of 85 to 99 volume % of the diamond sintered compact material consisting of diamond grains bonded with each other and the balance of pores, and the other part than the cutting edge vicinity part consists of diamond grains and the balance of a brazing material.

BRIEF DESCRIPTION OF THE DRAWING

The accompanying drawing illustrates the principle and merits of the present invention in more detail.

DETAILED DESCRIPTION OF THE INVENTION

Figure 1:
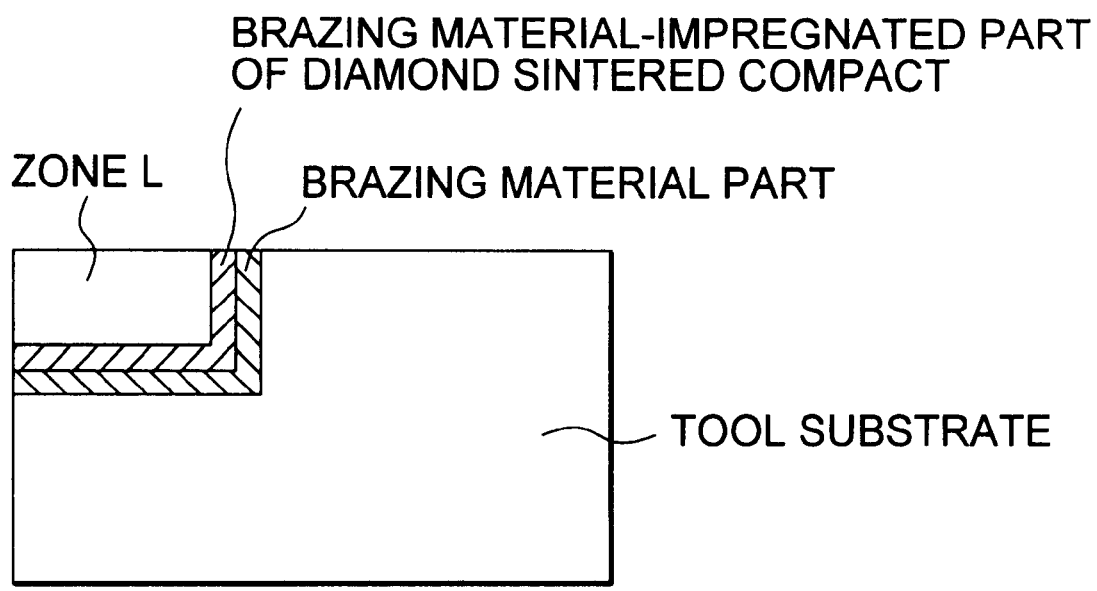
FIG. 1 is a cross-sectional view of a bonded part or portion of a diamond sintered compact and a tool substrate according to the present invention.

Considering the above described problems of the prior art, the inventors have developed a novel polycrystal diamond sintered compact tool capable of exhibiting excellent performances or properties not only in application ranges of diamond tools of the prior art, but also even in such conditions that problems on the heat resistance and anti-adhesion property thereof are not satisfactorily solved.

First, the inventors have analyzed the problems when using the sintered diamond compact described in Japanese Patent Laid-Open Publication Nos. 187603/1985. Consequently, it is found that during working, the vicinity of a cutting edge is at a high temperature due to working heat and there thus occurs a reaction of a metallic brazing agent impregnated in the sintered diamond compact with a workpiece. As a result of this reaction, adhesion of the metal to the tool edge during working occurs, thus unfavorably affecting the worked surface of the workpiece. According to the present invention, therefore, it is found that factors affecting the anti-adhesion property are improved to achieve the above described objects.

The feature of the present invention consists in (1) a polycrystal diamond tool comprising a diamond sintered compact, sintered under ultra-high pressure and high temperature, brazed onto a tool substrate, in which the cutting edge vicinity part consists of 85 to 99 volume % of the diamond sintered compact material consisting of diamond grains bonded with each other and the balance of pores, and the other part than the cutting edge vicinity part consists of diamond grains and the balance of a brazing material.

Preferred embodiments of the above described invention (1) are summarized below:

(2) The polycrystal diamond tool as described in the above (1), wherein the diamond grains have a grain size of 0.1 $\mu$m to 50 $\mu$m, preferably 0.5 $\mu$m to 10 $\mu$m.

(3) The polycrystal diamond tool as described in the above (1) or (2), wherein the diamond sintered compact material has a thickness of at least 0.1 mm, preferably 0.1 mm to 1.5 mm.

(4) The polycrystal diamond tool as described in any one of the above (1) to (3), wherein the cutting edge vicinity part consisting of diamond grains bonded with each other and the balance of pores occupies such a zone as having a width of 0.1% to 99%, preferably 50% to 99% of the thickness of the diamond sintered compact material in the thickness direction and a width of 0.5% to 100%, preferably 50% to 100% of the shortest distance between the pointed end of the edge and brazing material layer in the lateral direction.

(5) The polycrystal diamond tool as described in any one of the above (1) to (4), wherein the brazing material for bonding the diamond sintered compact and tool substrate consists of 0.5 to 20 weight %, preferably 0.5 to 10 weight % of at least one of Ti and Zr and the balance of at least one of Cu and Ag and unavoidable impurities.

(6) The polycrystal diamond tool as described in any one of the above (1) to (4), wherein the brazing material consists of 20 to 30 weight % of Ti, 20 to 30 weight % of Zr and the balance of Cu and unavoidable impurities.

In the above described embodiments (5) and (6), the unavoidable impurities are in such very small quantities as can be neglected.

For the practice of the present invention, a diamond sintered compact material containing a metallic binder sintered at an ultra-high pressure and high temperature is used. Since the diamond sintered compact tool according to the present invention has, at its edge, a part from which a metallic binder has been removed from the diamond sintered compact by an acid treatment, there is no acceleration of graphitization due to the metallic binder and of reaction of the metallic binder with workpiece components, in particular, in such a use that the edge part is at a high temperature, and the heat resistance and anti-adhesion property are improved to a much greater extent as compared with commercially available polycrystal diamond sintered compact tools because of excellent thermal conductivity resulting from direct bonding of diamond grains with each other. Moreover, when a metallic brazing material used for bonding with a supporting substrate is heated and bonded in vacuum, another part than the cutting edge vicinity can be impregnated with a metallic brazing material to increase the bonding strength between the supporting substrate and sintered compact and to improve the stability of the edge strength when used as a cutting tool, and the heat resistance and anti-adhesion property are improved in a diamond sintered compact tool in which the metallic binder is completely removed or a diamond sintered compact tool in which a metallic brazing material is impregnated in vacuum after completely removing the metallic binder.

As the diamond sintered compact material according to the present invention, it is preferable to use that having a diamond content of 85 to 99 volume %. When using the material having a diamond content of less than 85 volume %, the strength of the sintered compact after removing the metallic binder is not sufficient and the properties thereof as a cutting tool are deteriorated, which is not preferable. Furthermore, it is technically difficult to obtain a material having a diamond content of more than 99 volume % at the present time.

In the diamond sintered compact material according to the present invention, diamond grains are generally used with a grain size of 0.1 $\mu$m to 50 $\mu$m. The reason therefor is that if the grain size of the diamond grains is less than 0.1 $\mu$m, undesirable grain growth of diamond grains tends to occur during preparation of the sintered compact under ultra-high pressure and high temperature and the yield is markedly lowered on a commercial scale. Accordingly, this range should be avoided. On the other hand, if the grain size of the diamond grains is more than 50 $\mu$m, the strength of the diamond sintered compact material after the metallic binder is removed is so low that the properties as a cutting tool is deteriorated.

The diamond sintered compact material whose diamond grain size is in a range of 0.1 $\mu$m to 10 $\mu$m is capable of maintaining relatively high strength even after the metallic binder is removed and exhibiting more excellent performances, which is preferable.

The thickness of the diamond sintered compact material is preferably at least 0.1 mm. If the thickness is less than 0.1 mm, the diamond sintered compact material tends to be cracked during bonding to a substrate. This range is not preferable. In view of the general requirements and shape working cost as a cutting tool, therefore, a thickness of the diamond sintered compact ranging from 0.1 mm to 1.5 mm is more preferable. Particularly, the thickness of the diamond sintered compact material at the vicinity of the cutting edge part should preferably be about 0.1 μm to 1500 μm.

The shape of the diamond sintered compact material can be chosen from any one of ordinary throwaway inserts, bites, drills, reamers, etc.

As schematically shown in the accompanying drawing, a polycrystal diamond tool according to the present invention is characterized by having a zone (called "Zone L"), at the cutting edge vicinity part of a diamond sintered compact material, consisting of diamond grains bonded with each other and the balance of pores. Zone L preferably consists of 0.1 to 99% of the vertical direction of from a tool rake face to a bonded part or portion with a substrate in the thickness direction and 0.5 to 100% of the shortest distance of between the pointed end of the edge and the bonded part or portion with the substrate in the direction along the tool rake face. If Zone L is a zone of less than 0.1% of the vertical direction of from a tool rake face to a bonded part or portion with a substrate in the thickness direction or a zone of less than 0.5% of the shortest distance of between the pointed end of the edge and the bonded part or portion with the substrate in the direction along the tool rake face, the other part than Zone L is impregnated with a brazing material used for bonding the diamond sintered compact and substrate and the brazing material components enriched with chemical activity cause workpiece components to adhere to the tool surface and to deteriorate the properties as the tool. This zone is thus not suitable. On the other hand, it is technically difficult considering from the standpoint of processes for preparing the polycrystal diamond tool in the present invention to provide a zone of more than 99% of the vertical direction of from the tool rake face to the bonded part or portion with the substrate in the thickness direction or a zone of 100% of the shortest distance of between the pointed end of the edge and the bonded part or portion with the substrate in the direction along the tool rake face.

The above described construction can be controlled by retention time at a brazing temperature and a pressure to hold a supporting substrate+brazing material+diamond sintered compact material during brazing in vacuum.

Components of the brazing material for bonding the diamond sintered compact material to the tool substrate according to the present invention are specified from the viewpoint of directly bonding the diamond sintered compact material to the tool substrate and reliability of the bonding strength. From this viewpoint, as components of the brazing material, there are used Ag or Cu with an active metal such as Ti or Zr added thereto, thus improving the wetting property of the hard sintered compact material with the brazing material and increasing the bonding strength of the diamond sintered compact material and tool substrate.

The polycrystal diamond tool of the present invention can favorably be compared with prior art polycrystal diamond tools with respect to wear rersistance, fracture strength and heat resistance to a greater extent. Accordingly, the properties of the brazing material itself are important for obtaining such properties.

When some rigidity or toughness is required, in particular, a brazing material comprising 0.5 to 20 weight % of one or two of Ti and Zr and the balance of one or two of Cu and Ag with unavoidable impurities is most preferable. However, since Ag has a lower elasticity resulting in a large deformation, it is preferable to reduce the amount of Ag where rigidity is required. When the amount of at least one of active metals such as Ti and Zr is less than 0.5 weight %, the wetting property of the brazing material cannot sufficiently be improved and this is not suitable. On the other hand, when more than 20 weight %, a hard Ti or Zr compound tends to be precipitated to decrease the toughness of the brazing material. This is not suitable. More preferably, 0.5 to 10 weight % of Ti or Zr is incorporated.

When heat resistance and rigidity are required for the brazing material, in particular, a brazing material comprising a larger amount of Ti or Zr excellent in strength as well as high temperature property as compared with the above described brazing material and the balance of Cu with unavoidable impurities is preferably used and more preferably, a brazing material comprising 20 to 30 weight % of Ti, 20 to 30 weight % of Zr and the balance of Cu and unavoidable impurities is used. In this case, depression of melting point due to a ternary eutectic system of Ti—Zr—Cu remarkably takes place, whereby bonding at a lower temperature is possible.

As a tool substrate, it is preferable to use cemented carbides comprising WC as a predominant component and 5 to 25 weight % Co, steels, for example, containing at least one of Mn, Ni, Cr and Mo in addition to 0.3 to 0.6 weight % of carbon, etc.

EXAMPLE

The following Examples are given in order to illustrate the present invention in detail without limiting the same.

Example 1

A sintering agent consisting of diamond grains with a grain diameter of 0.1 to 10 μm and iron group metal grains (e.g. Co, Fe and Ni) was prepared. The diamond grains and iron group metal grains were ball milled in a predetermined proportion to form a mixed powder. The resulting mixed powder was heat-treated in vacuum at a temperature of 800° C. for 1 hour, charged in a capsule made of Ta, and sintered under ultra-high pressure and high temperature, i.e. a pressure of 55 kb and a temperature of 1450° C. to obtain a diamond sintered compact material. Using this procedure, the mixing proportion of the diamond grains and iron group metal was changed to prepare sintered compact materials having different diamond contents as shown in Table 1.

The thus obtained diamond sintered compact material was cut in a predetermined shape by discharge working, charged in a closed vessel with a fluoro-nitric acid solution comprising a mixture of nitric acid with a mole concentration of 30% and hydrofluoric acid with a mole concentration of 45% in a proportion of 4:1, maintained at a temperature of 130° C. for 12 hours to elute other components than diamond contained in the diamond sintered compact.

The resulting diamond sintered compact material was brazed to a tool substrate of a cemented carbide using a brazing material consisting of 70% Ag-28% Cu-2% Ti (% by weight) by holding in vacuum at a temperature of 850° C. for 10 minutes, thus preparing a cutting tool having the diamond sintered compact brazed to one corner of a cemented carbide with a predetermined shape, i.e. a regular triangle with an inscribed circle of 9.525 mm, clearance angle 11° (overall circumference) and thickness 3.18 mm, and having an edge worked in R-shape of radius 0.4 mm. As the cemented carbide, there was used one comprising WC as a predominant component and 4 to 6 weight % of Co.

The resulting cutting tool was subjected to estimation of the cutting properties under the following conditions:

Workpiece: Al-16 weight % Si alloy round rod

Rotation Speed of Workpiece Surface: 900 m/min

Cutting Depth: 0.5 mm

Feed Speed: 0.15 mm/rev

Cutting Time: 5 min

Compositions of the diamond sintered compact materials prepared in this way and estimation results of the cutting property thereof are tabulated in Table 1. Sample No. H in Table 1 is a cutting tool prepared for comparison with the product of the present invention, by cutting the resulting sintered compact by discharge working, brazing in the air to a tool substrate made of the cemented carbide by the use of an ordinary silver braze containing Ag as a main component and working into a predetermined shape to obtain a cutting tool without eluting any metallic binder components. In Sample Nos. 1 to 3, the brazing material components were impregnated in a range of from the bonded part to 50–100 μm.

TABLE 1

| Sample No. | Mixing Ratio of Iron Group Metal (wt %) | Diamond Content in Sintered Compact (vol %) | Flank Wear Width (μm) |
|---|---|---|---|
| 1 | 25 | 82 | broken |
| 2 | 20 | 88 | 70 |
| 3 | 8 | 94 | 65 |
| H | 20 | 88 | 82 |

It is apparent from Table 1 that Sample Nos. 2 and 3 of the present invention exhibit more excellent wear resistance than polycrystal diamond sintered compacts of the prior art. In Sample No. 1 having a diamond content of less than 85%, lowering of the strength due to elution of the metallic binder components took place to break the tip so that cutting be impossible.

Example 2

Diamond grains having different grain diameters as shown in Table 2, coated with a sintering agent hereinafter described by an electroless plating method, were prepared and were heat-treated in vacuum at a temperature of 1200° C. for 1 hour. This powder was charged in a capsule made of a cemented carbide and sintered at a pressure of 50 kb and a temperature of 1400° C. to obtain a diamond sintered compact material.

The thus obtained diamond sintered compact material was cut in a material shape for a cutting tool or a material shape for measurement of the strength by discharge working, charged in a closed vessel with a fluoro-nitric acid solution comprising a mixture of nitric acid with a mole concentration of 30 %, hydrofluoric acid with a mole concentration of 45% and distilled water in a proportion of 2:0.05:1 and maintained at a temperature of 150° C. for 24 hours to elute other components than diamond contained in the diamond sintered compact material, thus obtaining materials for a cutting tool and for measurement of the strength.

The material for measurement of the strength was worked into a test piece having a length of 6 mm, width of 3 mm and thickness of 0.4 mm, and subjected to a three-point bending test under a condition of a span distance of 4 mm to measure the strength of the sintered compact material (transverse rupture strength).

The material for a cutting tool was brazed to a tool substrate of a cemented carbide using a brazing material consisting of 92% Cu-2% Al-3% Si-3% Ti by holding in vacuum at a temperature of 1050° C. for 10 minutes and working into a predetermined shape, i.e. a circle of 13.2 mm in diameter and a total thickness of the diamond sintered compact part and tool susbstrate of 3.18 mm, thus preparing a cutting tool. The cemented carbides comprising WC as a predominant component and 6 to 9 weight % Co was used. In Sample Nos. 4 to 7, the brazing material components were impregnated in a range of from the bonded part to 50–100 μm.

Sample No. H in Table 2 is same as that used in Example 1 and was subjected to the similar estimation for comparison with Sample Nos. 4 to 7 of the present invention without elution of the metallic binder components.

The resulting cutting tool was subjected to estimation of the cutting properties under the following conditions:

Workpiece: Al-16 weight % Si alloy round rod

Rotation Speed of Workpiece Surface: 600 m/min

Cutting Depth: 3.0 mm

Feed Speed: 0.2 mm/rev

Cutting Time: 4 min

TABLE 2

| Sample No. | Diamond Grain Diameter (μm) | Diamond Content in Sintered Compact (vol %) | Flank Wear Width (μm) | Presence of Adhesion | Strength of Sintered Compact Material (kgf/mm²) |
|---|---|---|---|---|---|
| H | 0.1 ~ 10 | 88 | 110 | more | 145 |
| 4 | 0.1 ~ 4 | 87 | 75 | less | 135 |
| 5 | 0.1 ~ 10 | 91 | 78 | less | 105 |
| 6 | 0.1 ~ 50 | 94 | 74 | less | 90 |
| 7 | 0.1 ~ 70 | 97 | broken | | 75 |

In Sample Nos. 4 to 7, the proportion of diamond powder is 93 vol % and that of a sintering agent is 7 vol %, the sintering agent comprising, by wt %, 90.85% Co-5.0% W-4.0% Fe-0.05% Pb-0.10% Sn, in constant composition.

As is apparent from the results of Table 2, Sample Nos. 4 to 6 can favorably be compared with the prior art diamond sintered compacts. Sample No. 7 has such a large diamond grain diameter and a low strength that the tool tip was broken during cutting.

Example 3

Using the diamond sintered compact material of Sample No. 4, prepared in Example 2, a cutting tool was prepared in an analogous manner to Example 2 except differing in the brazing step as shown in the following:

Sample No. 4A: Same as described in Example 2

Sample No. 4Z: When brazing is carried out in vacuum, a brazing material and diamond sintered compact material are stacked on a tool substrate in this order and held by a jig under a pressure, during which the brazing is effected.

For the resulting cutting tool, elementary analysis was carried out in a bonded part of a tool substrate and diamond sintered compact material to investigate an impregnated state of brazing material components. The thickness of the diamond sintered compact material in the prepared tool was 1.0 mm and the elementary analysis of a side part of the diamond sintered compact tool was carried out by an energy dispersion spectrochemical analysis.

In Sample No. 4A, impregnation of Cu as a component of the brazing material was confirmed in a range of from the bonded part to about 50 μm, while in Sample No. 4Z, impregnation of the brazing material was confirmed in the overall all range of the diamond sintered compact.

As the tool substrate, there was used a cemented carbide alloy comprising WC, as a predominant component, and 11 to 13 weight % of Co.

Using these samples, cutting work was carried out under the following conditions:

Workpiece: Al Alloy (JIS A6061, T6 processed material)
Rotation Speed of Workpiece Surface: 200 m/min
Cutting Depth: 0.5 mm
Feed Speed: 0.2 mm/rev
Cutting Time: 5 min It was investigated according to this cutting work whether adhesion took place on at least one of the tool rake face and flank face or not. Moreover, measurement of the roughness of a finished surface of the workpiece was also carried out. The results are also shown in Table 3.

TABLE 3

| Sample No. | Presence or Absence of Adhesion | Roughness of Finished Surface Rz ($\mu$m) |
| --- | --- | --- |
| 4 A | no adhesion | 1.6 |
| 4 Z | adhesion | 7.8 |

In Sample No. 4A having a cutting edge vicinity part consisting of diamond grains bonded with each other and the balance of pores, there was no adhesion to the tool edge and good finished surface roughness was obtained. On the other hand, in Sample 4Z in which the brazing material was impregnated even at the cutting edge vicinity part, adhering to the edge was vigorous and deterioration of the finished surface roughness was found remarkable.

Example 4

Investigation was carried out as to influences due to difference in thickness of the diamond sintered compact material. Samples were prepared in an analogous manner to Example 2 except changing the thickness of the diamond sintered compact material as shown in the following, based on Sample 4A prepared in Example 3:

Sample No. 4B: Material Thickness 0.5 mm
Sample No. 4C: Material Thickness 0.1 mm
Sample Nos. 4A, 4B and 4C were subjected to a milling working under the following conditions:
Workpiece: Block of Aluminum Alloy (JIS ADC 12), width 80 mm, length 400 mm and height 100 mm
Rotation Speed of Cutter: 2000 m/min
Cutter Diameter: 100 mm; Number of Cutting Edges: one
Cutting Depth: 1.5 mm
Feed Speed: 0.2 mm/rev
Cutting Time: 40 min Sample Nos. 4A and 4B could be used for cutting with substantially the same flank wear width, less adhesion and no breakage of the edge. On the other hand, Sample No. 4C met with breakage in the diamond sintered compact during working and continuous working was impossible. Namely, the thickness of the diamond sintered compact became thinner to lower the fracture strength of the sintered compact, which could not be put to practical use.

Example 5

Investigation was carried out as to influences due to difference in components of the brazing material used during bonding the diamond sintered compact material and tool substrate. Samples were prepared in an analogous manner to Example 2 except changing the brazing material used in the brazing step as shown in Table 4, using the diamond sintered compact material of Sample No. 4, prepared in Example 2:

These tools were subjected to cutting working under the similar conditions to described in Example 2. The results are shown in Table 4.

TABLE 4

| Sample No. | Composition of Brazing Material (weight %) | Brazing Temperature (° C.) | Flank Wear Width ($\mu$m) |
| --- | --- | --- | --- |
| 4 | 92% Cu - 2% Al - 3% Si - 3% Ti | 1050 | 75 |
| 4D | 70% Ag - 28% Cu - 2% Ti | 850 | 82 |
| 4E | 50% Cu - 25% Ti- 25% Zr | 900 | 84 |
| 4Y | 72% Ag - 28% Cu | 800 | brazing impossible |

In the case of Sample 4Y, the tool substrate and diamond sintered compact material could not be bonded because of a problem on wetting property during brazing in contrast with Sample Nos. 4, 4D and 4E.

Example 6

Using Sample Nos. 4 and H, described in Example 2, cutting working was carried out under the following conditions:

Workpiece: Al—SiC Alloy (cylindrical sleeve, inner diameter boring of outer diameter 120 mm, inner diameter 90 mm and height 130 mm)
Rotation Speed of Tool: 500 m/min
Cutting Depth: 0.1 mm
Feed Speed: 0.3 mm/rev
Cutting Time: 5 min In the case of Sample No. H, the flank wear width reached about 150 $\mu$m, fine tipping occurred and adhesion was found on the rake face. On the other hand, in the case of Sample No. 4, the flank wear width was about 100 $\mu$m and adhesion on the rake face was found very little. That is, it is apparent that the tool of the present invention can favorably be compared with the diamond sintered compact tools of the prior art with respect to wear resistance, fracture strength and anti-adhesion property.

Example 7

The materials of Sample Nos. 4 and H, same as described in Example 6, were brazed to a cutter for board-working of a building material to prepare samples and then subjected to cutting under the same conditions for the same time. In the case of Sample No. H, cracks occurred on the workpiece because of increase of a cutting resistance accompanied with a marked progress in wearing of the tool flank face. On the other hand, in the case of Sample No. 4, the flank wear width of the tool was smaller than that of Sample No. H and no cracks occurred on the workpiece.

Advantages of the Invention

The polycrystal diamond sintered compact according to the present invention is largely improved as compared with the diamond sintered compacts of the prior art and thus provided with an excellent heat resistance, anti-adhesion property and fracture strength. In addition, this polycrystal diamond sintered compact is capable of contributing greatly to the industrial growth because of being produced with a similar cost to the diamond sintered compacts of the prior art.

What is claimed is:

1. A polycrystal diamond tool comprising a diamond sintered compact, sintered under ultra-high pressure and high temperature, brazed onto a tool substrate, in which the cutting edge vicinity part consists of 85 to 99 volume % of the diamond sintered compact material consisting of diamond grains bonded with each other and the balance of pores, and the other part than the cutting edge vicinity part consists of diamond grains and the balance of a brazing material.

2. The polycrystal diamond tool as claimed in claim 1, the diamond grains have a grain size of 0.1 $\mu$m to 50 $\mu$m.

3. The polycrystal diamond tool as claimed in claim 1, wherein the diamond sintered compact material has a thickness of at least 0.1 mm.

4. The polycrystal diamond tool as claimed in claim 1, wherein the cutting edge vicinity part consisting of diamond grains bonded with each other and the balance of pores occupies such a zone as having a width of 0.1% to 99% of the thickness of the diamond sintered compact material in the thickness direction and a width of 0.5% to 100% of the shortest distance between the pointed end of the edge and brazing material layer in the lateral direction.

5. The polycrystal diamond tool as claimed in claim 1, wherein the brazing material for bonding the diamond sintered compact and tool substrate consists of 0.5 to 20 weight % of at least one of Ti and Zr and the balance of at least one of Cu and Ag and unavoidable impurities.

6. The polycrystal diamond tool as claimed in claim 1, wherein the brazing material consists of 20 to 30 weight % of Ti, 20 to 30 weight % of Zr and the balance of Cu and unavoidable impurities.

* * * * *